UNITED STATES PATENT OFFICE.

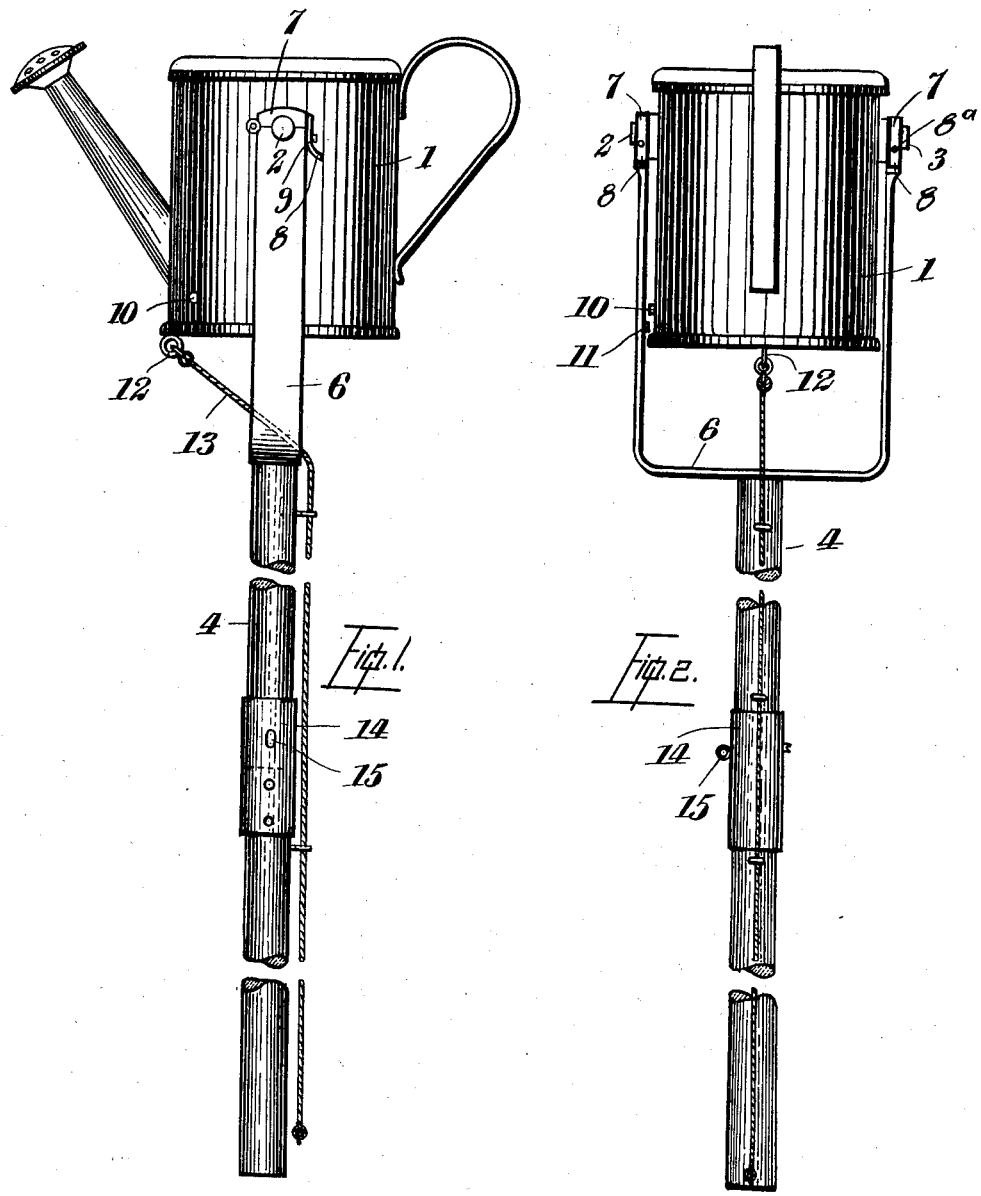

STEAPHEN CHAMBERS SKANKS, OF TORONTO, ONTARIO, CANADA.

WATERING-CAN.

1,078,005.  Specification of Letters Patent.  Patented Nov. 11, 1913.

Application filed December 23, 1912. Serial No. 738,313.

*To all whom it may concern:*

Be it known that I, STEAPHEN CHAMBERS SKANKS, a subject of the King of Great Britain, residing in the city of Toronto, Province of Ontario, Dominion of Canada, have invented certain new and useful Improvements in Watering-Cans, of which the following is a specification.

My invention relates to improvements in watering cans and more particularly to an attachment therefor, and the object of the invention is to enable the person using the can to water hanging baskets or plants on shelves without the necessity of employing a step ladder.

The invention consists of a watering can having trunnions on each side thereof, a pole of variable length having a forked upper end, said fork having apertures therein designed to receive the trunnions, the upper portions of the forked end being made so as to open in order that the watering can may be removed from the fork, and a cord suitably attached to the watering can and extending down the pole, all as hereinafter more particularly described and illustrated in the accompanying drawing, in which:

Figure 1 represents a side elevation of a device constructed according to my invention. Fig. 2 is a rear elevation thereof.

1 is the watering can having the trunnions 2 and 3.

4 is the pole divided into suitable portion if desired.

6 is the fork, at the upper end thereof having the detachable upper ends 7 suitably hinged to the forked portions.

8 is a depending spring lip attached to each of these upper portions 7 and having an aperture 8ª therein into which a pin 9 secured to the forked portion 6 is designed to be inserted when the portion 7 is in place, thus holding the watering can in position.

10 is a stop on the side of the watering can designed to engage a stop 11 on the inner face of one of the forked portions 6 in order to prevent the can from turning over too far.

12 is a ring attached to the bottom of the can at its forward edge and 13 is a cord extending from the ring down beside the pole 4.

From the above description it will be seen that the can can be filled and then held up to the desired position by means of the pole, then by pulling on the cord 13 the forward side of the can will be depressed, thus causing the water to flow from the spout. Further, the can can be detached from the forked portion and may be used independently thereof in the same manner as an ordinary watering can.

If it is desired to water plants that are low down the pole may be inverted so as to extend above the can. When the pole is inverted suitable pins 15 are used for securing the sections of the pole together, said pins extending through apertures in the sleeve 14 and the sections 4; each section of the pole having a sleeve secured to it at one end, and being adapted at its opposite end to be received by the corresponding sleeve of the preceding section.

What I claim as my invention is:

In a device of the character described, in combination, a can, trunnions secured to the can, a pole formed in sections, each section having at one end a socket and being at its other end adapted to be received by the corresponding socket of another section secured thereto by a pin, a forked portion at the end of said pole, said forked portion terminating at its forked ends in hinged caps adapted to form in their closed position journals for receiving the aforesaid trunnions, and each of said caps being provided at its side remote from the hinge, with a spring having an orifice adapted to engage with a pin on the forked portion of the pole, said spring being adapted to lock the cap in its closed position, a pin secured to the lower portion of the can, said pin being adapted to engage with a pin secured to the inner side of the forked portion of the pole, and act as a stop, limiting the pivotal movement of said can on its trunnions, a cord secured to the bottom of the can and adapted to extend downwardly along the side of the pole and also adapted to control the pivotal motion of said can.

In witness whereof I have hereunto set my hand in the presence of two witnesses.

STEAPHEN CHAMBERS SKANKS.

Witnesses:
RUSSEL S. SMART,
PEARLE M. GARROW.

Copies of this patent may be obtained for five cents each, by addressing the "Commissioner of Patents, Washington, D. C."